United States Patent [19]
Deffenbaugh et al.

[11] 3,870,851
[45] Mar. 11, 1975

[54] WELDING MACHINES

[75] Inventors: James F. Deffenbaugh; Arthur L. Williams, Warren; Robert S. Ellis, Canfield, all of Ohio

[73] Assignee: Wean United, Inc., Youngstown, Ohio

[22] Filed: Mar. 21, 1973

[21] Appl. No.: 343,478

[52] U.S. Cl.................. 219/97, 40/125 R, 219/109
[51] Int. Cl............................................ B23k 11/04
[58] Field of Search............ 219/97, 100, 108, 109; 40/125 A, 125 R, 125 D, 63 R; 340/172.5; 68/12; 35/1

[56] References Cited
UNITED STATES PATENTS

| | | | |
|---|---|---|---|
| 2,531,033 | 11/1950 | Doutt | 219/97 |
| 3,142,771 | 7/1964 | Wendt | 68/12 X |
| 3,220,227 | 11/1965 | Schmitt | 68/12 |
| 3,542,994 | 11/1970 | Deffenbaugh et al. | 219/97 |
| 3,548,144 | 12/1970 | Riley | 219/97 |

*Primary Examiner*—Bruce A. Reynolds
*Attorney, Agent, or Firm*—Michael Williams

[57] ABSTRACT

The invention relates to an analog system for use in welding, and more particularly electric resistance welding, and comprises a plurality of schedules, which may be in the form of strips of any suitable material, the strips being selectively positioned in predetermined relation with respect to the welder controls. Each strip bears a series of indicia, either in numerical or letter form, and such indicia is aligned with respective welder controls to thereby indicate to the machine operator the exact settings for the various controls in order to form a precise weld for known conditions, such as the composition or thickness of the material to be welded.

4 Claims, 4 Drawing Figures

3,870,851

WELDING MACHINES

BACKGROUND AND SUMMARY

This invention is particularly adapted for use in controlling welding functions of a flash welder, although it is not limited to such use.

A flash welder control commonly in use is illustrated on page 48 of the Resistance Welding Manual published by the Resistance Welder Manufacturers Association. The illustration shows a flashing and push up control cam rotated in unison with a variable speed, motor driven timing control. A roller is held against the cam surface, the roller being mounted on a lever which is connected to a sleeve valve. The sleeve valve controls flow of hydraulic fluid to the cylinder which actuates the movable platen of the flash welder. The only controls on this type welder included means to vary the speed of the cam and the position of the tap switch of the transformer. Modern welders have a multitude of controls to cover a wide range of welding requirements.

It is common knowledge that the controls of a flash welder must be precisely adjusted to set the welder for optimum operation on metals of various compositions and gauges. Heretofore, a welding machine operator made a log of the various settings of the controls, either in a notebook or on file cards or the like, and the logged settings were quite frequently arrived at by trial and error. Experienced operators zealously guarded their logs and therefore each new operator had to go through the same trial and error period to establish a reliable log of his own. Even where log notations were shared, they were not always reliable for use on a different welder since it is recognized that even identically manufactured welding machines are sometimes slightly different in operating functions.

The present invention proposes the use of a plurality of schedule strips for each machine, each strip having logged characteristics for welding metal of specific composition and gauge. The logged characteristics are represented by indicia which is in predetermined position on the strip. The strip is placed in predetermined position on the welder control programing box so that the predetermined indicia aligns with the respective controls to quickly and reliably show the operator the exact setting for each control for the particular work to be welded.

DESCRIPTION OF THE DRAWING

In the drawing accompanying this specification and forming a part of this application, there is shown, for purpose of illustration, an embodiment which the invention may assume, and in this drawing.

DESCRIPTION OF THE PREFERRED EMBODIMENT

Figure 1:
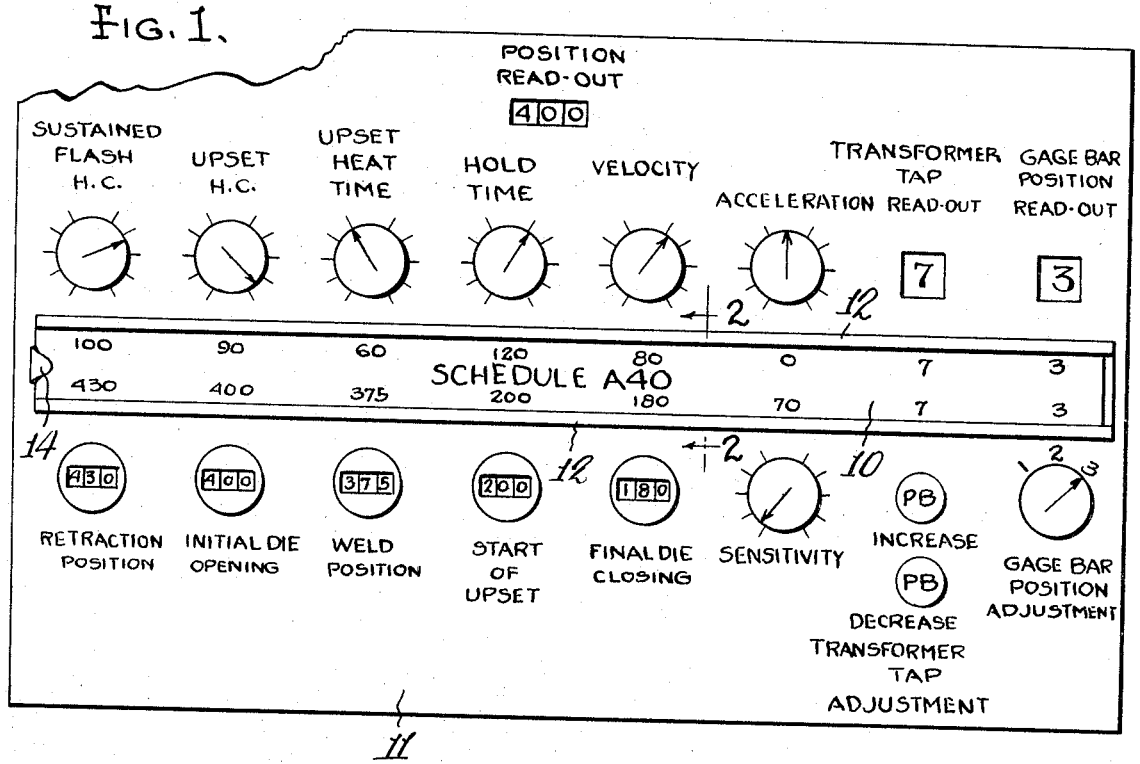
FIG. 1 is a face view of the multiple switch arrangement for a flash welder.
Figure 2:
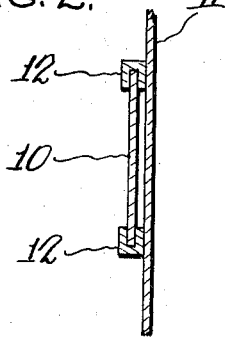
FIG. 2 is a fragmentary sectional view corresponding to the line 2—2 of FIG. 1.
Figure 3:
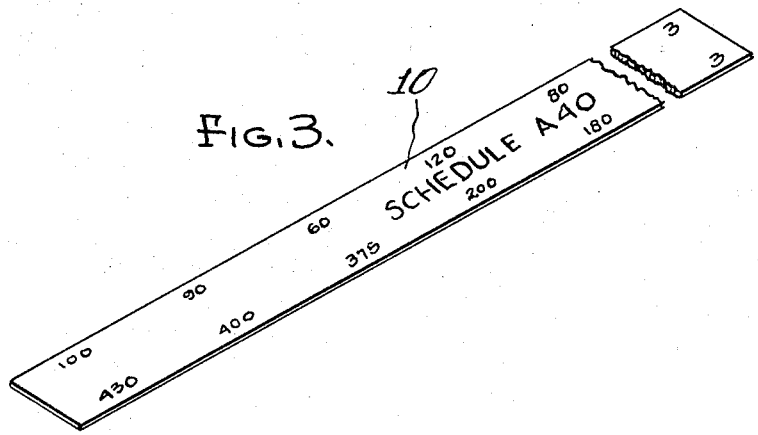
FIG. 3 is a perspective view of a schedule strip.

FIG. 1 represents a multiple programing box arrangement, the contents of which form part of a solid state, integrated circuit system providing digital read-out selection of platen positioning and digital position read-out, for control of a flash welder. The programing box arrangement includes various control knobs (or thumb wheel adjustors) and read-out windows, so that the welder circuit system may be adjusted to accomplish a definite welding schedule for metals of specific composition and gauge. The control knobs (or thumb wheel adjustors) and read-out windows are disposed in a predetermined relation so that a reference member, preferably in the form of a schedule strip 10, may be placed in fixed relation thereto, the indicia on the schedule strip indicating the exact setting for the various controls.

In the disclosed embodiment, this strip may be formed of metal, plastic or any material that will withstand repeated handling. The programing box 11 is formed with spaced guides 12—12 between which the strip may be slid endwise to predetermined location. As illustrated, the strip may be slid endwise between the guides 12 from the right hand side thereof, and abut against a stop 14 at the left hand side for proper location.

In order to effect compactness, control knobs are positioned adjacent to opposite longitudinal edges of the schedule card. As seen in FIG. 1, six control knobs and two windows are located generally in in-line manner above the schedule strip, and seven control knobs are located generally in in-line manner below the schedule strip.

Reading from left to right, the upper row in the disclosed embodiment includes knobs for "sustained flash," "upset," "upset heat time," "hold time," "velocity" and "acceleration." The upper row also includes read-out windows for "transformer tap" and "gauge bar position." These upper knobs may be moved over respective scales which are calibrated in either cycles or seconds.

Reading from left to right, the lower row in the disclosed embodiment includes knobs for "retraction position," "initial die opening," "weld positions," "start of upset," "final die opening," "sensitivity," two push buttons for "increase" or "decrease" of "transformer tap adjustment," and a knob for "gauge bar position adjustment." It will be appreciated that other controls may be added, or the controls herein shown may be modified.

Figure 4:
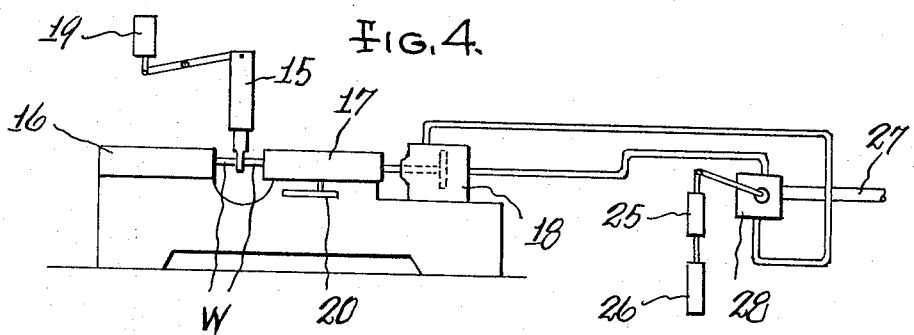
FIG. 4 is a schematic representation of a flash welder and actuating means therefore, of known construction.

Gauge bars 15 (see FIG. 4) are normally used to properly space the workpieces W clamped between the stationary weld die 16 and movable weld die 17, the latter being shifted linearly toward and away from the stationary die by means of a hydraulic cylinder 18. In FIG. 4, the gauge bar is shown to have three stepped surfaces which define three spacing settings for the workpieces W. The gauge bar position knob is rotatable to any one of three positions to effect operation of a valve (not shown) which admits fluid to a cylinder 19 to move a selected step surface of the gauge bar to position for abutment by the workpieces W. A digital position read-out meter (not shown but of known construction) will display the proper number in the gauge bar position read-out window. The schedule strip 10 has the numeral "3" aligned with the gauge bar position knob to show the operator that the "3" setting of the knob for gauge bar position should be used for welding the workpieces identified as "Schedule A 40" on the strip.

The transformer tap push buttons are selectively pushed to increase or decrease the tap setting of the welding transformer and a digital meter (not shown)

may be positioned behind the transformer tap read-out window to visually indicate the tap setting. In FIG. 1, the schedule strip 10 for "Schedule A 40" shows that a tap setting of "7" is required, and the tap adjustment push buttons are selectively pushed by the operator until the read-out window shows the numeral "7."

In the integrated circuits as herein used, the distance between adjoining faces of the welding dies 16 and 17 is sensed by a precision, linear, film-type potentiometer 20 which may be of any commercially available type. This potentiometer has its body secured to the machine frame and its slider secured to the movable welding die so that the potentiometer produces an electrical signal proportional to the position of the movable welding die.

If the closed die position (the position wherein the adjoining faces of the stationary and movable welding dies are in abutment) is selected as the zero position, the electrical signal in volts will be equal to inches of displacement from the zero position. For example, the signal for 1.25 inches will be 1.25 volts. This permits the proper settings of the knobs controlling potentiometers which in turn control die position. The five knobs in the lower row, reading from the left, may cooperate with scales to indicate the amount of rotation required of each knob. However, in the disclosed embodiment, these knobs are the rotatable part of digital read-out potentiometers of any commercially available type.

In FIG. 1, the control knob of the digital potentiometer for "initial die opening" is set for "400" to accord with numeral "400" on schedule strip 10. A digital voltmeter, fed by the signal from any of the platen-position potentiometers, will indicate the position of the movable die in the "position read-out" windows. A setting of the "initial die opening" potentiometer at "400" indicates that the adjoining faces of the stationary and welding dies are spaced 4 inches. These dies are open and the workpieces W are fed into respective dies to abut against the "3" position surface of the gauge bar, and the dies are then closed to tightly clamp the workpieces.

The other control knobs also control settings of potentiometers and these knobs are rotated so that their settings correspond to the setting indicated on the schedule strip 10 for welding according to "Schedule A 40." The machine is now set for fully automatic welding to produce an optimum weld as determined by the indications on the schedule strip.

All the operator needs to do then is to press the start button (not shown) of the machine and the fully integrated system takes over. Initially, the die faces are spaced 4 inches in accordance with the "400" setting of the "initial die opening" potentiometer. As seen in FIG. 4, the metering valve 25 is operated by a potentiometer 26 which moves in exact accordance with the linear potentiometer 20. The metering valve controls flow of pressure fluid from a line 27, connected to a suitable source, and through flow control valve 28 to either side of the cylinder 18.

After the start button is pushed by the operator, the electrical circuit is controlled by the "retraction position" potentiometer and since the latter is set for "430," this means the movable die will be retracted so that the distance between the die faces is 4.3 inches. This distance is sufficient to permit retraction of the gauge bar 15 from between the workpieces and this retraction is automatically effected when the die spacing reaches 4.3 inches.

After the gauge bar has been retracted, the circuit is under control of the "weld position" potentiometer and since this is set at "375," the movable die will be moved toward the fixed die until the spacing of the dies is 3.75 inches, at which time flashing will start. The heat of flashing will be under control of the "sustained flash" potentiometer and this is set for "100" which indicates heating current will be applied to the welding dies, and thus to the workpieces, at full (100 percent) heat.

The flashing motion portion of the welding cycle will be under control of a system manufactured by the assignee of the present invention under U.S. Pat. No. 3,542,994, and sold under the trademark ADAPTAMATIC. Briefly, in this system the direction of weld die motion is controlled by the direction of oil flow through a servo valve. The direction of oil flow may be reversed by reversing the direction of the current in the valve coil. Thus, the weld die velocity and direction may be changed by varying the magnitude of the valve coil current. The valve coil current is produced by a difference between two rectified voltages.

One of these voltages is taken from the machine transformer primary and is designated as the Command voltage. The other is taken from the secondary of the machine transformer at the welding die and is designated as the Feedback voltage. These two voltages are rectified and the resulting D.C. voltage outputs are connected so that no net voltage is available to produce valve coil current if the outputs are equal in magnitude.

If the Feedback voltage is greater than the Command voltage, the valve coil current will be in a direction that will cause the movable welding die to move in the forward or normal flashing direction. If the Feedback voltage is less than the Command voltage, the movable welding die will move in the reverse direction. The velocity of the movable welding die is directly proportional to the difference in the magnitude of the two voltages.

The Adaptamatic system controls the movable welding die until the die faces reach a spacing of two inches, at which time the "start of upset" potentiometer takes control, since it is set for "200." This also effects the "upset" and "upset heat time" potentiometers and the former controls the amount of heat applied to the workpieces, in seconds or cycles, whereas the latter controls the time of application of the upset heat in seconds or cycles.

The movable welding die continues its movement toward the stationary die, for proper upset, until the die faces are spaced 1.8 inches which represents the final die opening as controlled by the final die opening potentiometer which has been set at "180." Velocity and acceleration of the movable welding die through all positions, except from the start of weld to upset, are under control of the "velocity" and "acceleration" potentiometers, which have respectively been set to "80" and "0" in accordance with the numerals in the schedule strip for "Schedule A 40."

When the die spacing reaches 1.8 inches, the "final die opening" potentiometer stops operation of the welding machine and automatically opens the welding dies so that the welded workpieces may be removed therefrom.

When the workpieces of different composition and/or gauge are to be welded, the operator selects another schedule strip (which may be designated as "Schedule B 30" for example) which has indicia thereon for the correct setting of all the knobs discussed above.

We claim:

1. In a welding machine having a program box control panel having a grouped plurality of diverse manually adjustable control devices for welding components wherein each control device is provided with a movable member extending from said panel to effect adjustment thereof to an operational setting required for welding workpieces of differing characteristics with said movable members having a predetermined array on said panel, the improvement comprising:
   a plurality of discrete reference members of substantially planar configuration for selective cooperative association with said control panel,
   means on the exterior of said panel for removably receiving and supporting a single said reference member on said panel adjacent said array of control device movable members,
   each said reference member having indicia thereon specifying the operational setting of each said control device movable member for a desired work to be performed,
   said indicia for each said device having a position on said reference member to dispose the same in juxtaposition to its associated said movable member, respectively, when said reference member is received and supported on said panel.

2. The construction according to claim 1 wherein said reference member supporting means includes elongated guide means to slidably receive a said reference member and said member comprises an elongated strip formed of rigid material for cooperation with said guide means.

3. The construction according to claim 2 wherein said movable members are disposed in a row, said guide means being parallel to said row and slidably engaging a strip edge, and said reference strips having their markings disposed parallel to the strip edge which is engaged by said guide means.

4. The construction according to claim 2 wherein said movable members are disposed in two parallel rows, said guide means being disposed between said rows and parallel thereto and including a pair of gibs to slidably receive opposed marginal surfaces of said reference strips, and said reference strips having their markings along and inwardly of said opposed marginal surfaces.

* * * * *